US011907766B2

(12) United States Patent
Verma et al.

(10) Patent No.: US 11,907,766 B2
(45) Date of Patent: Feb. 20, 2024

(54) SHARED ENTERPRISE CLOUD

(71) Applicant: INTERNATIONAL BUSINESS MACHINES CORPORATION, Armonk, NY (US)

(72) Inventors: Dinesh C. Verma, New Castle, NY (US); Raghu Kiran Ganti, White Plains, NY (US); Bijan Davari, Mahopac, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 353 days.

(21) Appl. No.: 17/089,548

(22) Filed: Nov. 4, 2020

(65) Prior Publication Data

US 2022/0138015 A1 May 5, 2022

(51) Int. Cl.
*G06F 9/50* (2006.01)
*H04L 67/10* (2022.01)

(52) U.S. Cl.
CPC .......... *G06F 9/5072* (2013.01); *G06F 9/5077* (2013.01); *G06F 9/5088* (2013.01); *H04L 67/10* (2013.01)

(58) Field of Classification Search
CPC .... G06F 9/5072; G06F 9/5077; G06F 9/5088; G06F 9/5061; G06F 9/5022; G06F 9/505;
(Continued)

(56) References Cited

U.S. PATENT DOCUMENTS 9,379,994 B2 6/2016 Wray
9,442,771 B2 9/2016 Morgan
(Continued)

FOREIGN PATENT DOCUMENTS

CN 103746997 A 4/2014
CN 104025055 A * 9/2014 ........... G06F 9/5072
(Continued)

OTHER PUBLICATIONS

Mell, P. et al., "Recommendations of the National Institute of Standards and Technology"; NIST Special Publication 800-145 (2011); 7 pgs.
(Continued)

*Primary Examiner* — David R Lazaro
*Assistant Examiner* — Mariegeorges A Henry
(74) *Attorney, Agent, or Firm* — Intelletek Law Group, PLLC; Gabriel Daniel, Esq.

(57) ABSTRACT

A cloud-enterprise resource management system enables sharing of computing resources belonging to different datacenters by one or more clients of a resource pooling and sharing service. Each datacenter of includes a first partition of computing resources and a second partition of computing resources. The first partition is designated as reserved for use by an enterprise operating the datacenter. The second partition is designated as available for use by one or more clients of the resource pooling and sharing service. A workload manager in each datacenter predicts workload and transfers (i) a first computing resource from the first partition to the second partition wherein when the predicted workload is below a first threshold and (ii) a second computing resource from the second partition to the first partition when the predicted workload is above a second threshold.

20 Claims, 8 Drawing Sheets

(58) Field of Classification Search
CPC .... G06F 2209/5011; G06F 9/50; H04L 67/10; H04L 41/147
USPC .................................................. 709/226, 223
See application file for complete search history.

(56) References Cited

U.S. PATENT DOCUMENTS

| | | | |
|---|---|---|---|
| 9,699,114 B1* | 7/2017 | Hintermeister | G06F 9/5072 |
| 10,496,541 B2 | 12/2019 | Yang et al. | |
| 2009/0083467 A1* | 3/2009 | Giles | G06F 13/24 |
| | | | 710/263 |
| 2011/0145413 A1 | 6/2011 | Dawson et al. | |
| 2015/0172204 A1 | 6/2015 | Anderson et al. | |

FOREIGN PATENT DOCUMENTS

| | | | | |
|---|---|---|---|---|
| CN | 104794239 A | | 7/2015 | |
| CN | 106534338 A | * | 3/2017 | ......... G06F 9/45533 |

OTHER PUBLICATIONS

Wan, Z. et al., "Cloud Migration: Layer Partition and Integration"; 2017 IEEE 1st International Conference on Edge Computing; IEEE Computer Society (2017); 8 pgs.

Aatikainen, G. et al., "Cost Benefits of Flexible Hybrid Cloud Storage: Mitigating Volume Variation with Shorter Acquisition Cycle"; The Journal of Systems and Software (2016); vol. 122; pp. 180-201.

* cited by examiner

SHARED ENTERPRISE CLOUD

BACKGROUND

Technical Field

The present disclosure generally relates to management of enterprise and cloud computing resources.

Description of the Related Arts

A datacenter is a dedicated space used to house computer systems and associated components, such as telecommunications and storage systems. Enterprise computing is the use of technology, information systems, and computers within an organization or business. An enterprise server is a computer server that includes programs required to collectively serve the requirements of an enterprise instead of an individual user, unit or specific application. Cloud computing is the delivery of different services or computing resources through the Internet, including data storage, servers, databases, networking, and software. Cloud-based storage makes it possible to save files to a remote database and retrieve them on demand. A cloud server is a virtual server (rather than a physical server) running in a cloud computing environment. It is built, hosted and delivered via a cloud computing platform via the internet, and can be accessed remotely. They are also known as virtual servers.

Many enterprises have spare capacity in their data-centers. Some large-scale enterprises offer cloud services by leveraging spare computing or storage capacity. However, offering cloud service from spare capacity is not viable at small scale, as spare server capacity may vary over time. Furthermore, enterprises may have security concerns as they let their servers be used by others.

SUMMARY

Some embodiments of the disclosure provide a cloud-enterprise resource management system enables sharing of computing resources belonging to different datacenters by one or more clients of a resource pooling and sharing service. Each datacenter of includes a first partition of computing resources and a second partition of computing resources. The first partition is designated as reserved for use by an enterprise operating the datacenter. The second partition is designated as available for use by one or more clients of the resource pooling and sharing service. A workload manager in the datacenter predicts workload and transfers (i) a first computing resource from the first partition to the second partition wherein when the predicted workload is below a first threshold and (ii) a second computing resource from the second partition to the first partition when the predicted workload is above a second threshold.

By predicting workload in an enterprise datacenter, a computing device serving as the workload manager of the enterprise datacenter can participate in a resource pooling and sharing service and enables a cloud-enterprise resource management system. Based on the predicted workload, the computing device dynamically determines whether to offer spare resource to the resource pooling and sharing service or request release of resources from the resource pooling and sharing service. The resource utilization efficiency of the enterprise datacenter is improved.

In some embodiments, the first partition of computing resources (enterprise partition) is designated as reserved for use by an enterprise, and the second partition of computing resources (spare partition) is designated as available for use by one or more clients of a resource pooling and sharing service that coordinate sharing of computing resources belonging to one or more enterprises by one or more clients. In some embodiments, access to the first partition is controlled by a first firewall that allows access by the enterprise and denies access by clients of the resource pooling and sharing service, or any entity outside of the enterprise.

In some embodiments, the predicted workload being sufficiently below the capacity of the enterprise partition (e.g., below the first threshold) is used as an indication that there is excess computing capacity in the enterprise partition, and that one or more computing resources can be moved from the enterprise partition to the spare partition.

In some embodiments, the workload manager instructs a robot to physically disconnect the first computing resource from the first partition and to physically connect the first computing resource to the second partition. The workload manager may also communicate with a cloud coordinator of the resource pooling and sharing service to provide an identifier of the first computing resource and to specify a time frame at which the first computing resource becomes available for use by the clients of the resource pooling and sharing service. The cloud coordinator may in turn facilitate a client of the resource pooling and sharing service to access the first computing resource by using the provided identifier of the first computing resource at the specified time frame. The cloud-coordinator also credits an account of the enterprise and debits an account of the client based on usage of the first computing resource.

In some embodiments, the predicted workload being within a failure margin of the capacity of the enterprise partition or exceeding the capacity of the enterprise partition (e.g., above the second threshold) is used as an indication that there is insufficient computing capacity in the enterprise partition so that one or more computing resources are moved from the spare partition back to the enterprise partition.

In some embodiments, the workload manager instructs the robot to physically disconnect the second computing resource from the second partition and to physically connect the second computing resource to the first partition. The workload manager may also communicate with the cloud coordinator of the resource pooling and sharing service to request a return or release of a computing resource and to receive a reply that includes an identifier of the computing resource being returned or released. The identifier may identify a computing resource in the second partition that is not being used by any client of the resource pooling and sharing service.

The preceding Summary is intended to serve as a brief introduction to some embodiments of the disclosure. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a Summary, Detailed Description and the Drawings are provided. Moreover, the claimed subject matter is not to be limited by the illustrative details in the Summary, Detailed Description, and the Drawings, but rather is to be defined by the appended claims, because the claimed subject matter can be embodied in other specific forms without departing from the spirit of the subject matter.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

Some embodiments of the disclosure provide a resource pooling and sharing service that enables a cloud-enterprise resource management system. The system allows multiple enterprises to be in a shared cloud service by pooling their excess server capacity. At the datacenter of each participating enterprise, the computing resources are divided into an enterprise partition (as an enterprise silo) and a spare partition (as a spare silo). The computing resources in the enterprise partition are resources reserved for use by the enterprise itself, while the computing resources in the spare partition can be made available for use as cloud servers.

In some embodiments, at each enterprise datacenter, an enterprise workload manager is implemented to allocate or assign computing resources into either the enterprise partition or the spare partition. The enterprise workload manager addresses security concerns by maintaining an air gap between the enterprise partition and the spare partition such that external clients of the spare servers cannot access the enterprise servers. The enterprise workload manager also makes resource allocation decisions between the enterprise partition and the spare partition (shifting boundaries between the two partitions) based on predictions of workload required by the enterprise. At the cloud, a cloud coordinator acts as the broker of all spare servers offered by all participating enterprises. The cloud coordinator matches requests for server capacity to the available spare server capacity in the participating enterprises. In some embodiments, the cloud coordinator also manages a credit system that keeps track of how much to bill the users of the spare servers and how much to credit the enterprises providing the spare servers.

Figure 1:
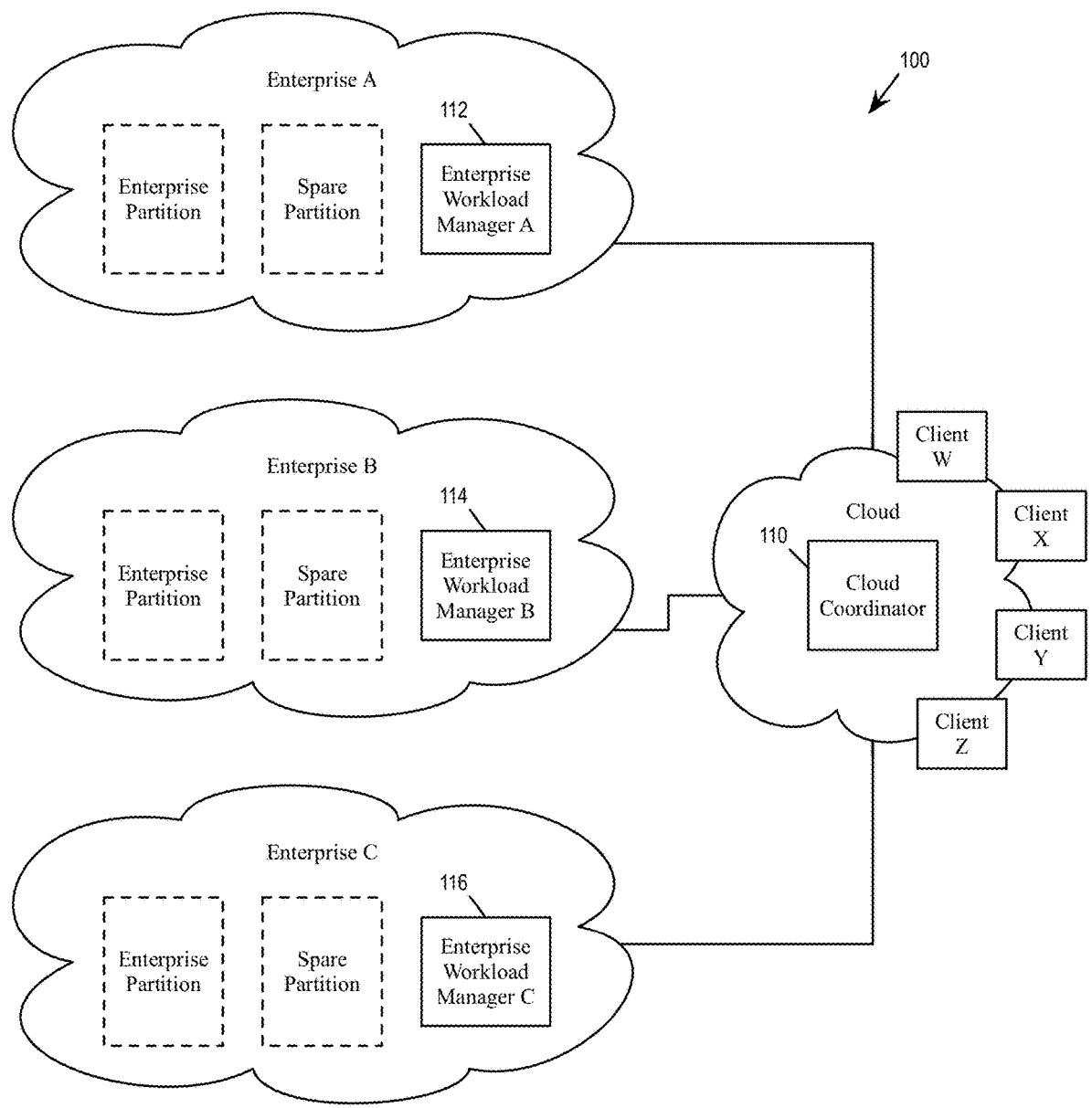
FIG. 1 illustrates a cloud-enterprise resource management system that is enabled by a resource pooling and sharing service, consistent with an illustrative embodiment.

For some embodiments, FIG. 1 illustrates a cloud-enterprise resource management system 100 that is enabled by a resource pooling and sharing service. In the cloud-enterprise resource management system 100, enterprises A, B, and C and clients W, X, Y, and Z participate in the resource pooling and sharing service such that spare computing resources of the enterprises A, B, and C can be shared over cloud with the clients W, X, Y, and Z.

In order to ensure security, each participating enterprise of the resource pooling and sharing service partitions its computing resources or servers into an enterprise partition and a spare partition. The computing resources or servers of the enterprise partition are designated as being reserved for use by the enterprise, while the computing resources or servers of the spare partition are designated as being available for use by the resource pooling and sharing service. Each participating enterprise may move computing resources from its enterprise partition into its spare partition and vice versa based on the predicted workload of the enterprise.

The resource pooling and sharing service of the cloud-enterprise resource management system 100 is implemented by a cloud coordinator 110 and enterprise workload managers at the participating enterprises. As illustrated, the enterprise A implements an enterprise workload manager 112, the enterprise B implements an enterprise workload manager 114, and the enterprise C implements an enterprise workload manager 116. The enterprise workload managers of enterprises A, B, and C determines which computing resources can be made available for the resource pooling and sharing service, and the cloud coordinator 110 in turn directs the clients W, X, Y, and Z to use the computing resources that are made available.

Figure 2:
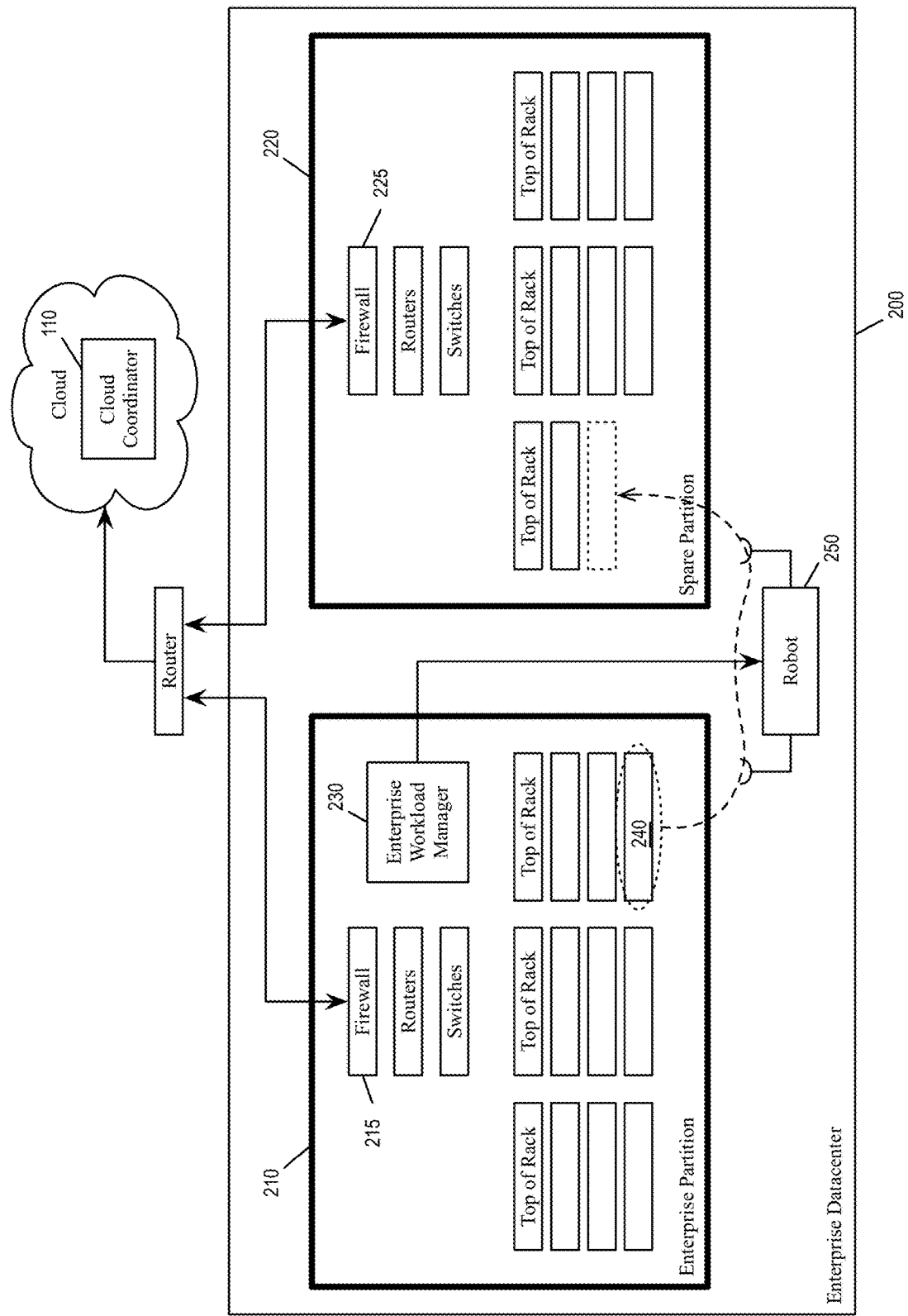
FIG. 2 conceptually illustrates a datacenter of an enterprise that supports the resource pooling and sharing service, consistent with an illustrative embodiment.

In some embodiments, the computing resources and servers of a participating enterprise may be located in one or more datacenters. FIG. 2 conceptually illustrates a datacenter 200 of an enterprise (e.g., the enterprise A of FIG. 1) that supports the resource pooling and sharing service. The enterprise datacenter 200 implements an enterprise partition 210 and a spare partition 220.

As illustrated, the enterprise partition 210 includes racks of computing resources or servers that are interconnected by switches and routers. The computing resources of the enterprise partition 210 are behind a firewall 215, which allows access to the computing resources of the enterprise partition 210 by the enterprise that operates or owns the datacenter. The firewall 215 allows only authenticated users of the enterprise, thereby preventing access of the enterprise partition 210 by entities outside of the enterprise, including clients of the resource pooling and sharing service. The spare partition 220 likewise includes racks of computing resources or servers that are interconnected by switches and routers. The computing resources of the spare partition 220 are behind a firewall 225 that allows access to the computing resources by the authenticated clients of the resource pooling and sharing service. The enterprise workload manager 230 of the enterprise is situated in the enterprise partition behind the firewall 215.

In some embodiments, the datacenter maintains a physical separation, or an "air gap" between the enterprise partition 210 and the spare partition 220. The "air gap" is for physically preventing the access of the computing resource in the enterprise partition by entities outside of the enterprise (e.g., clients of the resource pooling and sharing service). Specifically, no medium of communications exists between the hardware equipment (e.g., servers, racks, switches, routers) of the enterprise partition 210 and the hardware equipment of the spare partition 220 within the datacenter 200. In some embodiments, the enterprise partition 210 has no physical connection or contact with the hardware equipment of the spare partition 220. Consequently, one way to move a computing resource or server from the enterprise partition to the spare partition is to physically disconnect the computing resource from a hardware connection of the enterprise partition and to physically connect the computing resource to a hardware connection of the spare partition. Likewise, the only way to move a computing resource or server from the spare partition to the enterprise partition is to physically disconnect the computing resource from a hardware connection of the spare partition and to physically connect the computing resource to a hardware connection of the enterprise partition.

In the enterprise datacenter 200, a robot 250 is employed at the enterprise datacenter to physically connect and disconnect computing resources. For example, to transfer a computing resource 240 from the enterprise partition 210 to the spare partition 220, the enterprise workload manager 230 may instruct the robot 250 to perform the following operations: (1) unplug a cable between the computing resource 240 and a switch of the enterprise partition 210 and (2) plug-in a cable between the computing resource 240 and a switch of the spare partition 220.

In some other embodiments, a datacenter of an enterprise participating in the cloud-enterprise resource management system 100 does not use physical maneuvers to transfer computing resources between the enterprise partition and the spare partition. Instead, the computing resource being transferred remain in physical connections with both the enterprise partition and the spare partition, and the transfer is accomplished virtually in the electronic signaling domain, e.g., by changing the authentication requirement for the computing resource or imposing other software security measures to separate the enterprise partition and the spare partition.

Figure 3A:
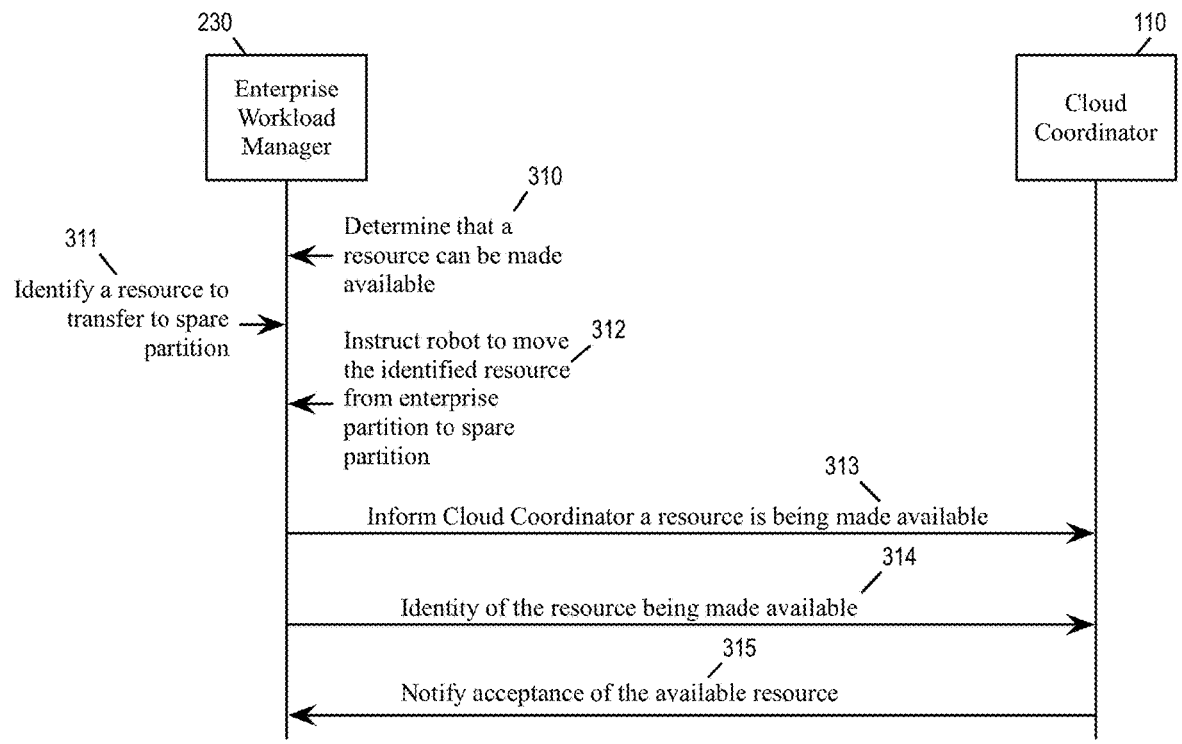
FIG. 3a illustrates the sequence of operations for transferring a computing resource from the enterprise partition to the spare partition, consistent with an illustrative embodiment.
Figure 3B:
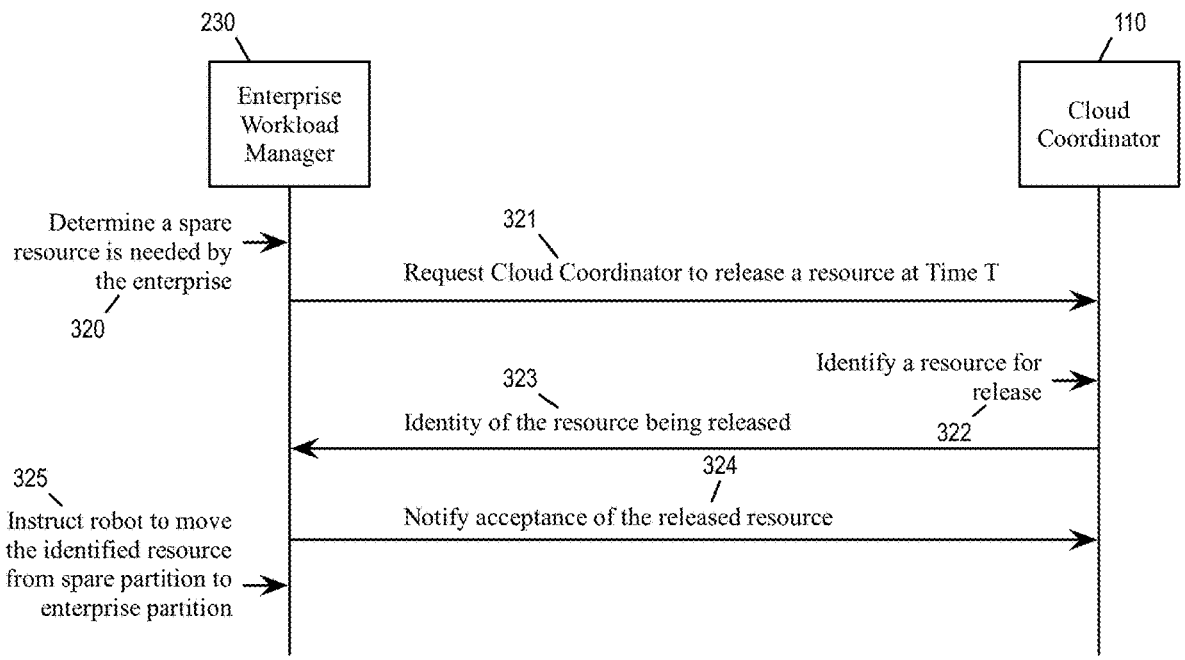
FIG. 3b illustrates example sequence of operations for transferring a computing resource from the spare partition back to the enterprise partition, consistent with an illustrative embodiment.

The transfer of computing resources between the enterprise partition and the spare partition is initiated by the enterprise workload manager 230 based on its prediction of the enterprise's workload at the datacenter. In some embodiments, the predicted workload being sufficiently below the capacity of the enterprise partition (e.g., below a first threshold) is used as an indication that one or more computing resources can be moved from the enterprise partition to the spare partition. Conversely, the predicted workload being within a safety margin of the capacity of the enterprise partition or exceeding the capacity of the enterprise partition (e.g., above a second threshold) is used as an indication that one or more computing resources need to be moved from the spare partition back to the enterprise partition. The enterprise workload manager 230 may in turn (1) notify the cloud coordinator 110 that a computing resources is being made available for the resource pooling and sharing service or (2) request the cloud coordinator 110 to release a computing resource from the resource pooling and sharing service. FIGS. 3a-b conceptually illustrate sequences of events at the enterprise workload manager 230 and the cloud coordinator 110 when transferring computing resources between the enterprise partition and the spare partition.

FIG. 3a illustrates the sequence of operations for transferring a computing resource from the enterprise partition 210 to the spare partition 220. As illustrated, the workload manager 230 determines (at step 310) that a resource can be made available to the resource pooling and sharing service resource pooling and sharing service, e.g., when the predicted workload of the enterprise is lower than a certain threshold. The workload manager identifies (at step 311) a computing resource that can be made available for the cloud. The workload manager 230 then instructs (at step 312) the robot 250 to move the identified resource from the enterprise partition 210 to the spare partition 220. The workload manager then informs (at step 313) the cloud coordinator 110 that a resource is being made available for the resource pooling and sharing service. The workload manager also sends (at step 314) the identity of the resource being made available to the cloud coordinator 110. The cloud coordinator in turn notifies (at step 315) the workload manager that the resource is accepted, and may direct clients of the resource pooling and sharing service to use the resource.

FIG. 3b illustrates an example sequence of operations for transferring a computing resource from the spare partition 220 back to the enterprise partition 210. As illustrated, the workload manager 230 determines (at step 320) that the enterprise may need additional computing resources at a future time, e.g., when the predicted workload of the enterprise is higher than a certain threshold. The workload manager requests (at step 321) the cloud coordinator 110 for release of a computing resource in the spare partition 220 at a specified time frame. The cloud coordinator 110 in turn identifies (at step 322) a computing resource in the spare partition 220 for release at the specified time and provides (at step 323) the identity of the computing resource being released. The cloud coordinator may identify a computing resource that is not being used by any client of the resource pooling and sharing service for release. The workload manager in turn notifies (at step 324) the cloud coordinator that the released resource is accepted. The workload manager also instructs (at step 325) the robot 250 to move the identified resource from the spare partition 220 to the enterprise partition 210.

In some embodiments, if all of the computing resources in the spare partition 220 are being used by clients of the resource pooling and sharing service, the cloud coordinator 110 may inform the workload manager 230 that all of the computing resources in the spare partition 220 are being used. The cloud coordinator 110 in these instances may wait until at least one of the computing resources in the spare partition 220 becoming idle before notifying (at step 324) the workload manager 230 of the identity of the computing resource to be released back to the enterprise partition.

Figure 4A:
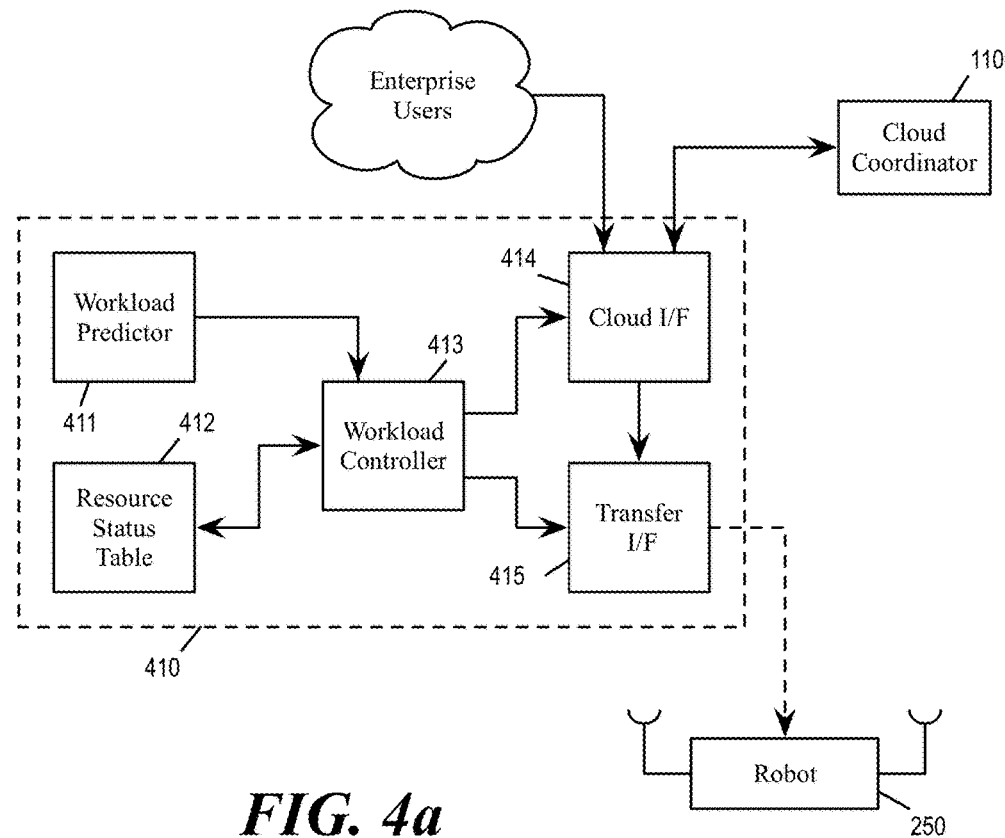
FIG. 4a conceptually illustrates a block diagram of the enterprise workload manager, consistent with an illustrative embodiment.

FIG. 4a conceptually illustrates a block diagram of the enterprise workload manager 230, consistent with an exemplary embodiment. The enterprise workload manager 230 is implemented on an example computing device 410. The computing device 410 implements a workload predictor 411, a resource status table 412, a workload controller 413, a cloud interface 414, and a transfer interface 415. In some embodiments, the modules 411-415 are modules of software instructions being executed by one or more processing units (e.g., a processor) of the computing device 410. In some embodiments, the modules 411-415 are modules of hardware circuits implemented by one or more integrated circuits (ICs) of an electronic apparatus. Though the modules 411-415 are illustrated as being separate modules, some of the modules can be combined into a single module. An example computing device 600 that may implement the computing device 410 will be described by reference to FIG. 6 below.

The workload predictor 411 predicts the workload to take place in the enterprise partition 210 at a future time frame. The workload predictor may make this prediction based on historical workload records, measurements or key performance indicators taken from the datacenter, as well as data provided by the enterprise operating the datacenter. The predicted workload is provided to the workload controller 413.

The workload controller 413 makes decisions regarding whether to move resources into or out of the spare partition based on the predicted workload provided by the workload predictor 411. The resource status table 412 maintains the status of the different computing resources in the datacenter. The status of a computing resource may include whether the computing resource is currently in the enterprise partition 210 or the spare partition 220, whether the computing resource is in active use by the enterprise, whether the computing resource is in active use by a client of the resource pooling and sharing service, etc. The workload controller 413 may use the content of the resource status table 412 to determine the current capacity of enterprise partition. Based on a comparison between the determined current enterprise partition capacity and the predicted workload, the workload controller 413 may (1) require additional capacity be added to the enterprise partition or (2) permit excess capacity be moved to the spare partition. The workload controller 413 may effectuate the corresponding transfer of computing resources by using the cloud interface 414 and the transfer interface 415.

The cloud interface 414 is used by the workload manager computing device 410 to communicate with the cloud coordinator 110 in order to (1) give the notification that a computing resource is being made available, (2) request the release a computing resource back to the enterprise partition, (3) identify the computer resources being transferred, and (4) determine the timing of when the transfer can take place. The communications between the cloud interface 414 and the cloud coordinator 110 are described by reference to FIGS. 3a-b above. The cloud interface 414 may include communications hardware and software components necessary for communicating through the Internet.

The transfer interface 415 controls the actual transfer of computing resources between the enterprise partition 210 and the spare partition 220. In some embodiments, the transfer interface 415 translates commands from the workload controller to specific instructions for controlling a robot (e.g., the robot 250) to physically disconnect and/or connect computing resources with the enterprise partition or the spare partition.

Figure 4B:
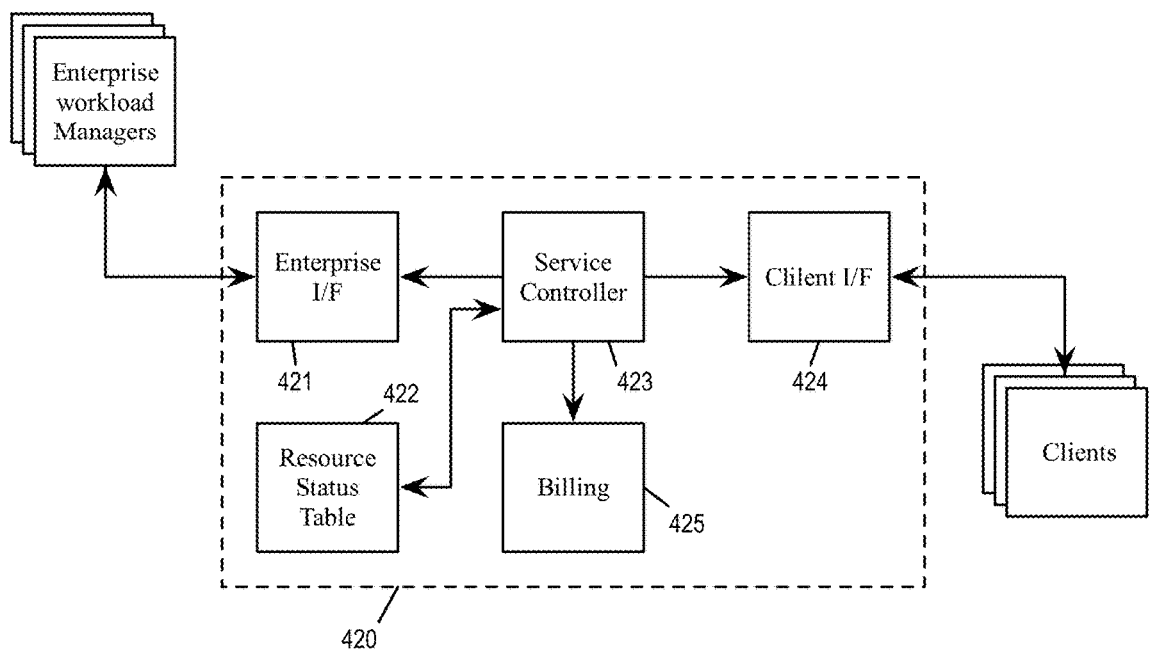
FIG. 4b conceptually illustrates a block diagram of the cloud coordinator, consistent with an illustrative embodiment.

FIG. 4b conceptually illustrates a block diagram of the cloud coordinator 110, consistent with an exemplary embodiment. The cloud coordinator 110 is implemented on an example computing device 420. The computing device 420 implements an enterprise interface 421, a resource status table 422, a service controller 423, a client interface 424, and a billing module 425. In some embodiments, the modules 421-425 are modules of software instructions being executed by one or more processing units (e.g., a processor) of the computing device 410. In some embodiments, the modules 421-425 are modules of hardware circuits implemented by one or more integrated circuits (ICs) of an electronic apparatus. Though the modules 421-425 are illustrated as being separate modules, some of the modules can be combined into a single module. An example computing device 600 that may implement the computing device 420 will be described by reference to FIG. 6 below.

The enterprise interface 421 is used by the cloud coordinator to communicate with the datacenters of the enterprises that participate in the resource pooling and sharing service. The communications between the enterprise interface 421 and the participating enterprises are described by reference to FIGS. 3a-b above.

The service controller 423 determines which computing resource is to be provided to which client of the resource pooling and sharing service. The service controller 423 learns from the enterprise interface 421 which computing resources are available at which enterprise datacenter (i.e., in the spare partition), and which enterprise is requesting a release of a computing resource from the resource pooling and sharing service. The status of each computing resource is kept at the resource status table 422, and the service controller 423 uses the content of the resource status table 422 to determine whether to assign a computing resource to a client or to release a computing resource back to an enterprise.

The resource status table 422 maintains the status of the different computing resources of the different enterprise datacenters participating in the resource pooling and sharing service. The status of a computing resource may include the identifier of the datacenter that house the computing resource, indicia of whether the computing resource is available for clients of the resource pooling and sharing service, indicia of whether the computing resource is currently being used by a client of the resource pooling and sharing service, the identity of the client that is using the computing resource, etc.

The client interface 424 is used to communicate with various clients of the resource pooling and sharing service. The information being relayed to a client may include identities or addresses of the computing resources that are made available to the client, as well the authentication information that are salient for the client to access the computing resources in their corresponding enterprise datacenters.

The billing module 425 maintains a database of the accounts of the clients and the participating enterprises. The billing module 425 monitors the use of the computing resources in the participating enterprises by the clients of the resource pooling and sharing service. For example, the billing module may credit an account of an enterprise and debit an account of a client based on the monitored usage of a computing resource by the client.

Figure 5:
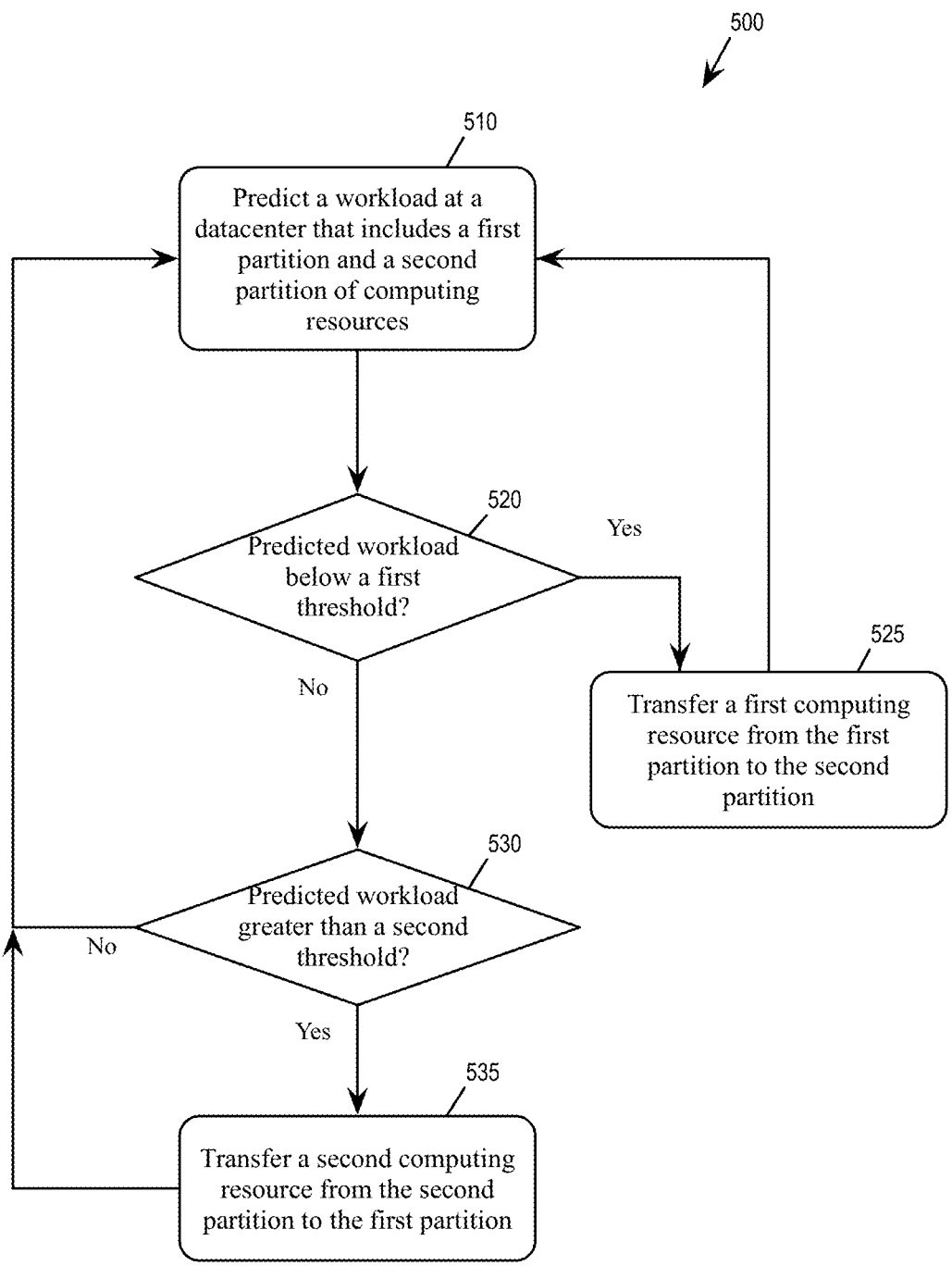
FIG. 5 conceptually illustrates a process for controlling a datacenter that participate in the resource pooling and sharing service, consistent with an illustrative embodiment.

FIG. 5 conceptually illustrates a process 500 for controlling a datacenter that participate in the resource pooling and sharing service, consistent with an exemplary embodiment. In some embodiments, one or more processing units (e.g., processor) of a computing device implementing the enterprise workload manager 230 (e.g., the computing device 410) perform the process 500 by executing instructions stored in a computer readable medium.

The workload manager predicts (at block 510) a workload at a datacenter that includes a first partition of computing resources and a second partition of computing resources. In some embodiments, the first partition of computing resources (enterprise partition) is designated as reserved for use by an enterprise, and the second partition of computing resources (spare partition) is designated as available for use by one or more clients of a resource pooling and sharing service that coordinate sharing of computing resources belonging to one or more enterprises by one or more clients. In some embodiments, access to the first partition is controlled by a first firewall that allows access by the enterprise and denies access by clients of the resource pooling and sharing service, or any entity outside of the enterprise.

The workload manager determines (at block 520) whether the predicted workload is below a first threshold. If the predicted workload is below a first threshold, the process proceeds to block 525. Otherwise the process proceeds to block 530. In some embodiments, the predicted workload being sufficiently below the capacity of the enterprise partition (e.g., below the first threshold) is used as an indication that there is excess computing capacity in the enterprise partition, and that one or more computing resources can be moved from the enterprise partition to the spare partition.

At block 525, the workload manager transfers a first computing resource from the first partition to the second partition. The process then returns to block 510 to further predict workload at the datacenter for the enterprise. In some embodiments, the workload manager instructs a robot to physically disconnect the first computing resource from the first partition and to physically connect the first computing resource to the second partition. The workload manager may also communicate with a cloud coordinator of the resource pooling and sharing service to provide an identifier of the first computing resource and to specify a time frame at which the first computing resource becomes available for use by the clients of the resource pooling and sharing service. The cloud coordinator may in turn facilitate a client of the resource pooling and sharing service to access the first computing resource by using the provided identifier of the first computing resource at the specified time frame. The cloud coordinator also credits an account of the enterprise and debits an account of the client based on usage of the first computing resource.

The workload manager determines (at block 530) whether the predicted workload is above a second threshold. If the predicted workload is above the second threshold, the process proceeds to block 535. Otherwise the process returns to block 510. In some embodiments, the predicted workload being within a failure margin of the capacity of the enterprise partition or exceeding the capacity of the enterprise partition (e.g., above the second threshold) is used as an indication that there is insufficient computing capacity in the enterprise partition so that one or more computing resources are moved from the spare partition back to the enterprise partition.

At block 535, the workload manager transfers a second computing resource from the second partition to the first partition. The process then returns to block 510 to further predict workload at the datacenter for the enterprise. In some embodiments, the workload manager instructs the robot to physically disconnect the second computing resource from the second partition and to physically connect the second computing resource to the first partition. The workload manager may also communicate with the cloud coordinator of the resource pooling and sharing service to request a return or release of a computing resource and to receive a reply that includes an identifier of the computing resource being returned or released. The identifier may identify a computing resource in the second partition that is not being used by any client of the resource pooling and sharing service.

By predicting workload in an enterprise datacenter, a computing device serving as the workload manager of the enterprise datacenter can participate in a resource pooling and sharing service and enables a cloud-enterprise resource management system. Based on the predicted workload, the computing device dynamically determines whether to offer spare resource to the resource pooling and sharing service or request release of resources from the resource pooling and sharing service. The resource utilization efficiency of the enterprise datacenter is improved.

The present application may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures (e.g., FIG. 5) illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
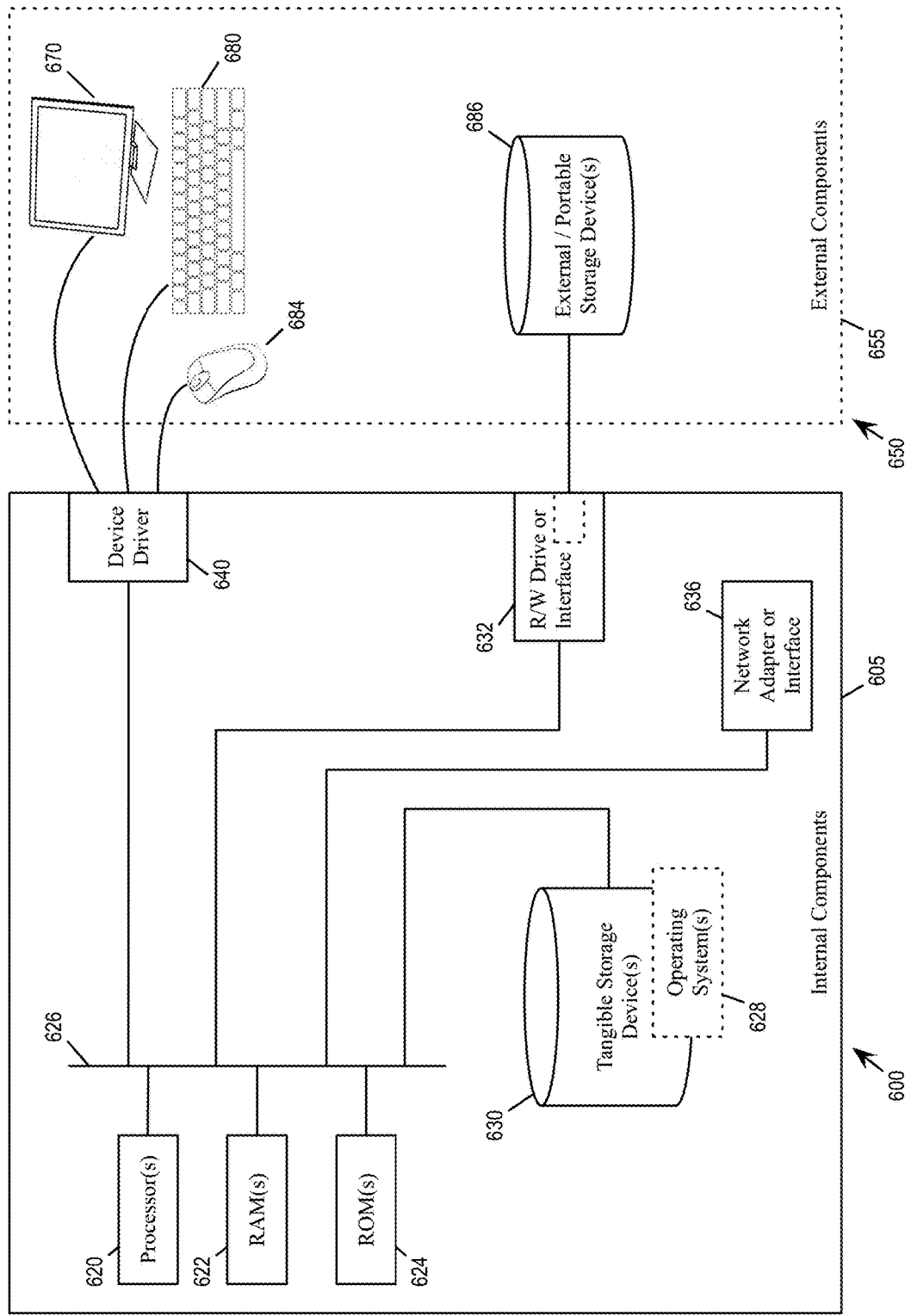
FIG. 6 shows a block diagram of the components of a data processing system in accordance with an illustrative embodiment of the present disclosure.

FIG. 6 shows a block diagram of the components of data processing systems 600 and 650 that may be used to implement a workload manager (e.g., 230) or a cloud coordinator (e.g., 110) in accordance with an illustrative embodiment of the present disclosure. It should be appreciated that FIG. 6 provides only an illustration of one implementation and does not imply any limitations with regard to the environments in which different embodiments may be implemented. Many modifications to the depicted environments may be made based on design and implementation requirements.

Data processing systems 600 and 650 are representative of any electronic device capable of executing machine-readable program instructions. Data processing systems 600 and 650 may be representative of a smart phone, a computer system, PDA, or other electronic devices. Examples of computing systems, environments, and/or configurations that may represented by data processing systems 600 and 650 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The data processing systems 600 and 650 may include a set of internal components 605 and a set of external components 655 illustrated in FIG. 6. The set of internal components 605 includes one or more processors 620, one or more computer-readable RAMs 622 and one or more computer-readable ROMs 624 on one or more buses 626, and one or more operating systems 628 and one or more computer-readable tangible storage devices 630. The one or more operating systems 628 and programs such as the programs for executing the process 500 are stored on one or more computer-readable tangible storage devices 630 for execution by one or more processors 620 via one or more RAMs 622 (which typically include cache memory). In the embodiment illustrated in FIG. 6, each of the computer-readable tangible storage devices 630 is a magnetic disk storage device of an internal hard drive. Alternatively, each of the computer-readable tangible storage devices 630 is a semiconductor storage device such as ROM 624, EPROM, flash memory or any other computer-readable tangible storage device that can store a computer program and digital information.

The set of internal components 605 also includes a R/W drive or interface 632 to read from and write to one or more portable computer-readable tangible storage devices 686 such as a CD-ROM, DVD, memory stick, magnetic tape, magnetic disk, optical disk or semiconductor storage device. The instructions for executing the process 500 can be stored on one or more of the respective portable computer-readable tangible storage devices 686, read via the respective R/W drive or interface 632 and loaded into the respective hard drive 630.

The set of internal components 605 may also include network adapters (or switch port cards) or interfaces 636 such as a TCP/IP adapter cards, wireless Wi-Fi interface cards, or 3G or 4G wireless interface cards or other wired or wireless communication links. Instructions of processes or programs described above can be downloaded from an external computer (e.g., server) via a network (for example, the Internet, a local area network or other, wide area network) and respective network adapters or interfaces 636. From the network adapters (or switch port adaptors) or interfaces 636, the instructions and data of the described programs or processes are loaded into the respective hard drive 630. The network may comprise copper wires, optical fibers, wireless transmission, routers, firewalls, switches, gateway computers and/or edge servers.

The set of external components 655 can include a computer display monitor 670, a keyboard 680, and a computer mouse 684. The set of external components 655 can also include touch screens, virtual keyboards, touch pads, pointing devices, and other human interface devices. The set of internal components 605 also includes device drivers 640 to interface to computer display monitor 670, keyboard 680 and computer mouse 684. The device drivers 640, R/W drive or interface 632 and network adapter or interface 636 comprise hardware and software (stored in storage device 630 and/or ROM 624).

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

On-demand self-service: a cloud consumer can unilaterally provision computing capabilities, such as server time and network storage, as needed—automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud-computing environment is service oriented with a focus on statelessness, low coupling, modularity, and semantic interoperability. At the heart of cloud computing is an infrastructure that includes a network of interconnected nodes.

Figure 7:
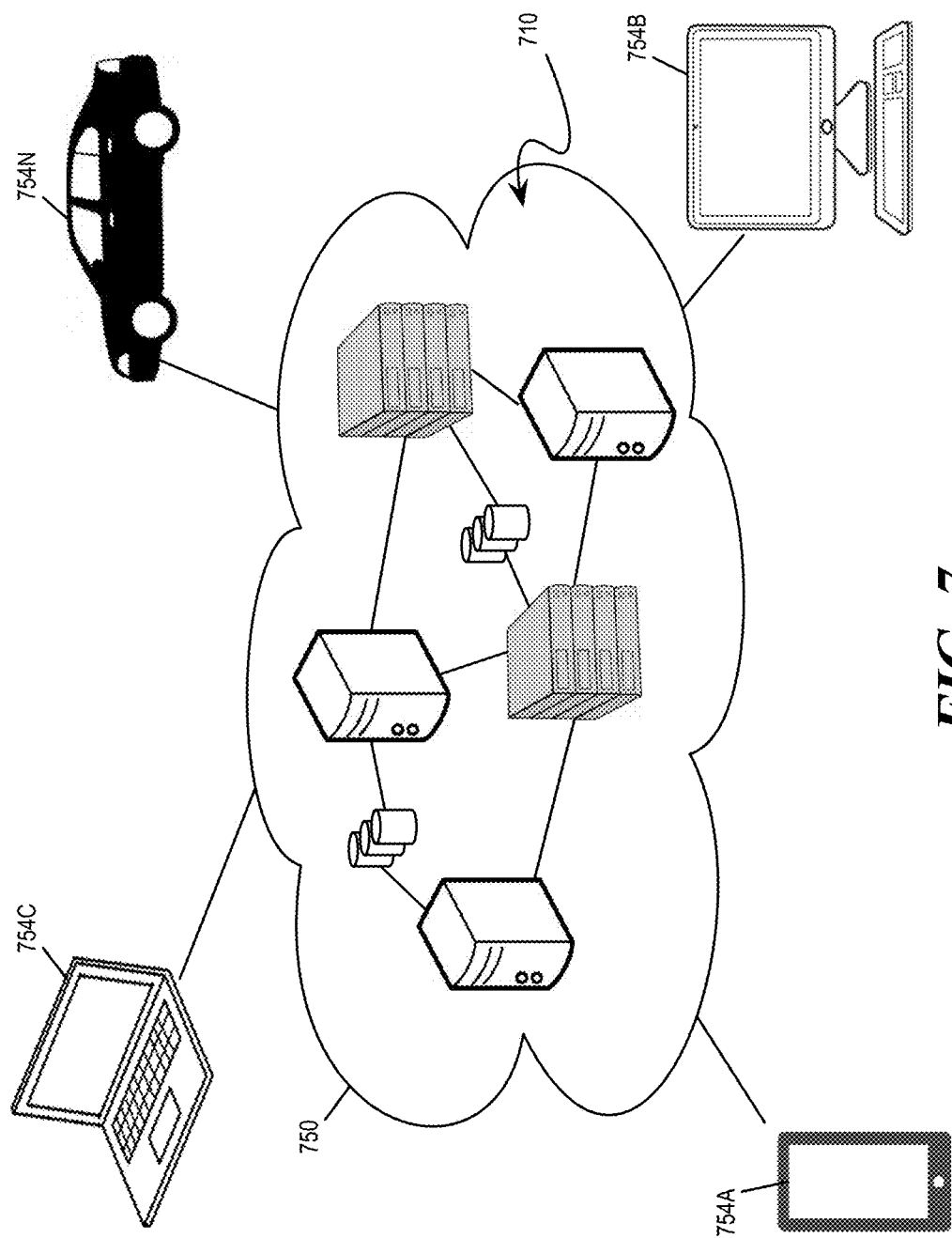
FIG. 7 illustrates an example cloud-computing environment.

Referring now to FIG. 7, an illustrative cloud computing environment 750 is depicted. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
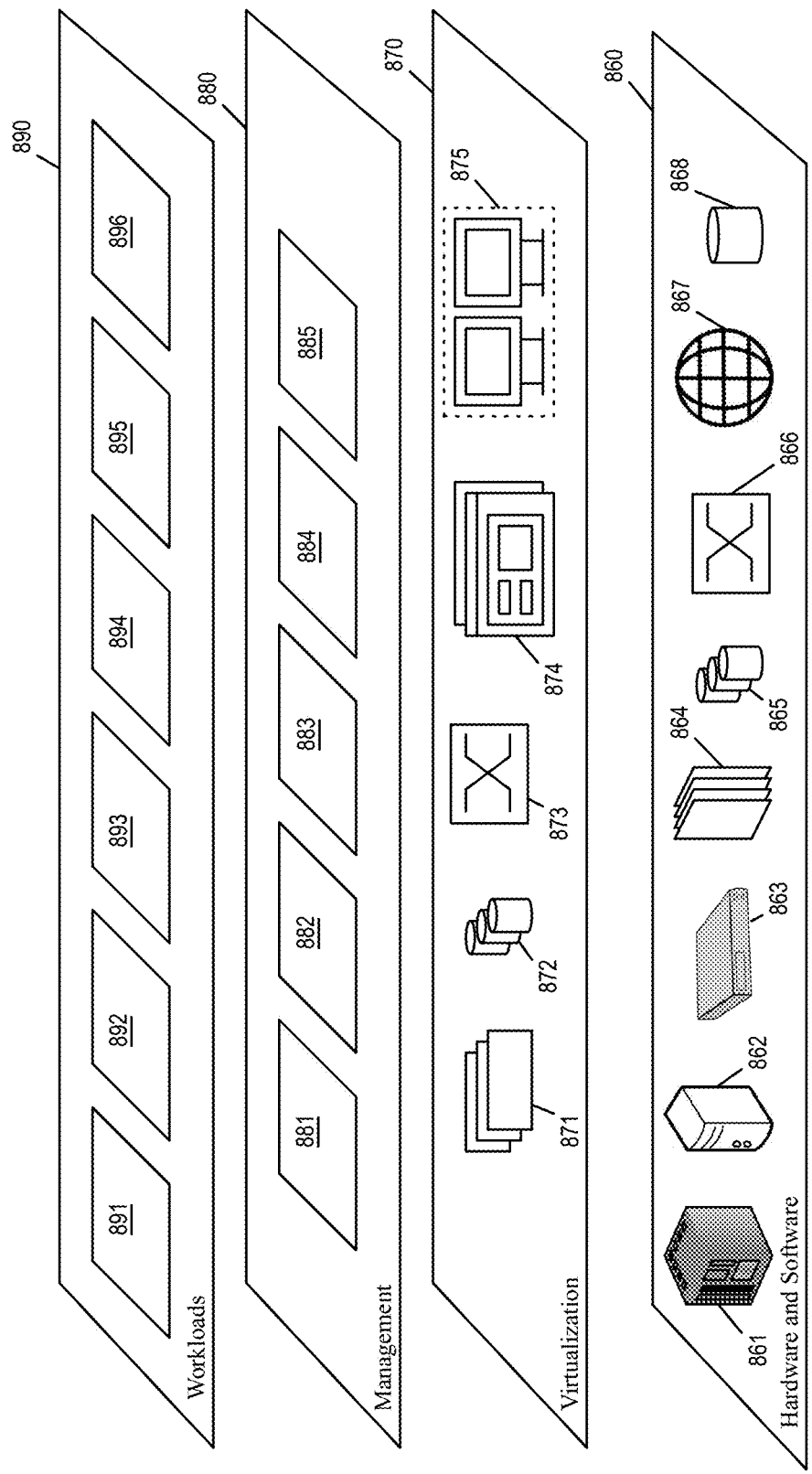
FIG. 8 illustrates a set of functional abstraction layers provided by a cloud-computing environment, consistent with an exemplary embodiment.

Referring now to FIG. 8, a set of functional abstraction layers provided by cloud computing environment 750 (of FIG. 7) is shown. It should be understood that the components, layers, and functions shown in FIG. 8 are intended to be illustrative only and embodiments of the disclosure are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud-computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and workload 896. In some embodiments, the workload 896 performs some of the operations of the cloud coordinator 110.

The foregoing one or more embodiments implements a workload manager at an enterprise datacenter for a resource pooling and sharing service in a cloud-enterprise resource management system. The workload manager is implemented within a computer infrastructure by having one or more computing devices performing workload predictions for the datacenter and moving computing resources between an enterprise partition and a spare partition based on the predicted workload. The computer infrastructure is further used to communicate with a cloud coordinator of the resource pooling and sharing service, which may also be implemented within a computer infrastructure.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
   a cloud coordinator configured to coordinate sharing of computing resources, belonging to a plurality of datacenters of enterprises, by one or more clients of a resource pooling and sharing service, wherein:
      a datacenter of each enterprise comprises a first partition of computing resources and a second partition of computing resources,
      the first partition of computing resources is designated as reserved for use by the enterprise,
      the second partition of computing resources is designated as available for use by one or more clients of the resource pooling and sharing service, and
      there is a physical air gap between the first partition of computing resources and the second partition of computing resources; and
   a plurality of workload managers, wherein:
      each workload manager is associated with a corresponding enterprise and is configured to predict workloads at a datacenter of its corresponding enterprise, and
      each workload manager is configured to transfer (i) a first computing resource from the first partition to the second partition of the datacenter of its corresponding enterprise upon determining that the predicted workload is below a first threshold and (ii) a second computing resource from the second partition to the first partition of the datacenter of its corresponding enterprise upon determining that the predicted workload is above a second threshold.

2. The system of claim 1, wherein the workload manager is configured to transfer the first computing resource from the first partition to the second partition by instructing a robot to physically disconnect the first computing resource from the first partition and to physically connect the first computing resource to the second partition.

3. A computer-implemented method comprising:
   predicting a workload at a datacenter of an enterprise that includes a first partition of computing resources and a second partition of computing resources, wherein the first partition of computing resources is designated by a common workload manager of the datacenter as reserved for use by the enterprise and the second partition of computing resources is designated as available for use by one or more clients of a resource pooling and sharing service that coordinate sharing of computing resources belonging to one or more enterprises by one or more clients;
   upon determining that the predicted workload is below a first threshold, transferring, by the workload manager of the datacenter, a first computing resource from the first partition to the second partition; and
   upon determining that the predicted workload is above a second threshold, transferring, by the workload manager of the datacenter, a second computing resource from the second partition to the first partition.

4. The computer-implemented method of claim 3, wherein transferring the first computing resource from the first partition to the second partition comprises instructing a robot to physically disconnect the first computing resource from the first partition and to physically connect the first computing resource to the second partition.

5. The computer-implemented method of claim 3, wherein transferring a first computing resource from the first partition to the second partition comprises communicating with a cloud coordinator of the resource pooling and sharing service to provide an identifier of the first computing resource and specifying a time frame at which the first computing resource becomes available for use by the clients of the resource pooling and sharing service.

6. The computer-implemented method of claim 5, wherein the cloud coordinator facilitates a client of the resource pooling and sharing service to access the first computing resource by using the provided identifier of the first computing resource at the specified time frame.

7. The computer-implemented method of claim 6, wherein the cloud coordinator credits an account of the enterprise and debits an account of the client based on a usage of the first computing resource.

8. The computer-implemented method of claim 3, wherein transferring the second computing resource from the second partition to the first partition comprises instructing a robot to physically disconnect the second computing resource from the second partition and to physically connect the second computing resource to the first partition.

9. The computer-implemented method of claim 3, wherein transferring a second computing resource from the second partition to the first partition comprises communicating with a cloud coordinator of the resource pooling and sharing service to request a return of a computing resource and to receive a reply that includes an identifier of the computing resource being returned.

10. The computer-implemented method of claim 9, wherein the identifier identifies a computing resource in the second partition that is not being used by any client of the resource pooling and sharing service.

11. The computer-implemented method of claim 3, wherein access to the first partition is controlled by a first firewall that allows access by the enterprise and denies access by clients of the resource pooling and sharing service.

12. A computing device comprising:
a processor; and
a storage device storing a set of instructions, wherein an execution of the set of instructions by the processor configures the computing device to perform acts comprising:
predicting a workload at a datacenter of an enterprise that includes a first partition of computing resources and a second partition of computing resources having a common workload manager of the datacenter, wherein:
the first partition of computing resources is designated as reserved for use by the enterprise, and
the second partition of computing resources is designated as available for use by one or more clients of a resource pooling and sharing service that coordinate sharing of computing resources belonging to one or more enterprises by one or more clients;
maintaining a physical air gap between the first partition of computing resources and the second partition of computing resources;
upon determining that the predicted workload is below a first threshold, transferring, by the workload manager of the datacenter, a first computing resource from the first partition to the second partition; and
upon determining that the predicted workload is above a second threshold, transferring, by the workload manager of the datacenter, a second computing resource from the second partition to the first partition.

13. The computing device of claim 12, wherein transferring the first computing resource from the first partition to the second partition comprises instructing a robot to physically disconnect the first computing resource from the first partition and to physically connect the first computing resource to the second partition.

14. The computing device of claim 12, wherein transferring a first computing resource from the first partition to the second partition comprises communicating with a cloud coordinator of the resource pooling and sharing service to provide an identifier of the first computing resource and specifying a time frame at which the first computing resource becomes available for use by the clients of the resource pooling and sharing service.

15. The computing device of claim 14, wherein the cloud coordinator facilitates a client of the resource pooling and sharing service to access the first computing resource by using the provided identifier of the first computing resource at the specified time frame.

16. The computing device of claim 15, wherein the cloud coordinator credits an account of the enterprise and debits an account of the client based on usage of the first computing resource.

17. The computing device of claim 12, wherein transferring the second computing resource from the second partition to the first partition comprises instructing a robot to physically disconnect the second computing resource from the second partition and to physically connect the second computing resource to the first partition.

18. The computing device of claim 12, wherein transferring a second computing resource from the second partition to the first partition comprises communicating with a cloud coordinator of the resource pooling and sharing service to request a return of a computing resource and to receive a reply that includes an identifier of the computing resource being returned.

19. The computing device of claim 18, wherein the identifier identifies a computing resource in the second partition that is not being used by any client of the resource pooling and sharing service.

20. The computing device of claim 12, wherein access to the first partition is controlled by a first firewall that allows access by the enterprise and denies access by clients of the resource pooling and sharing service.

* * * * *